April 28, 1925.
J. W. BISHOP
1,535,805
LUG CUTTING MACHINE
Filed Sept. 22, 1921
5 Sheets-Sheet 3
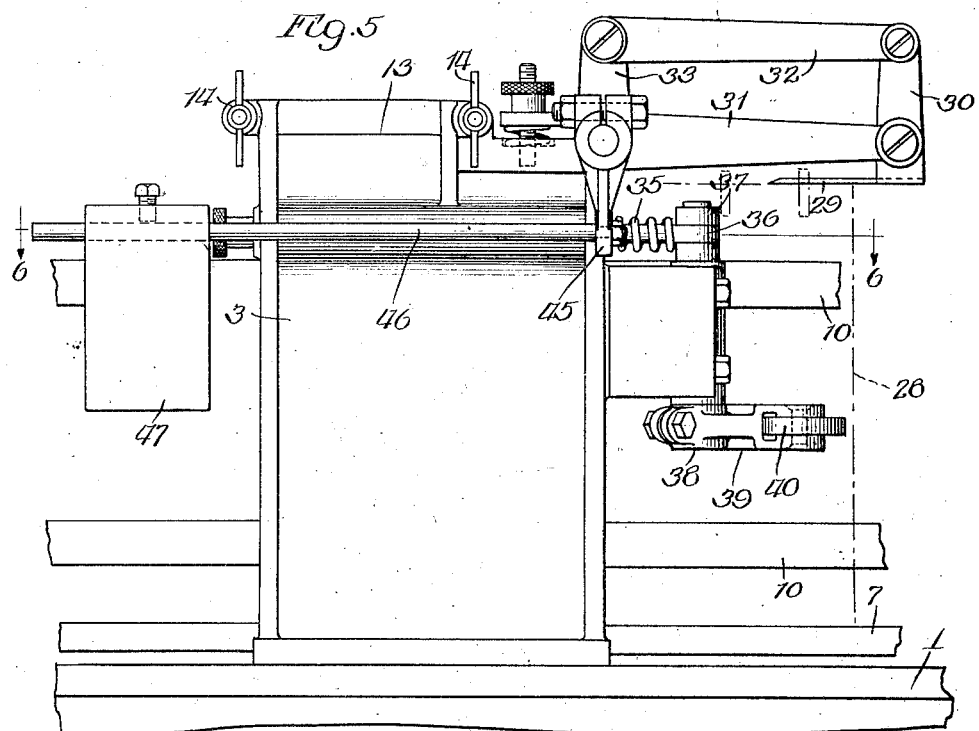
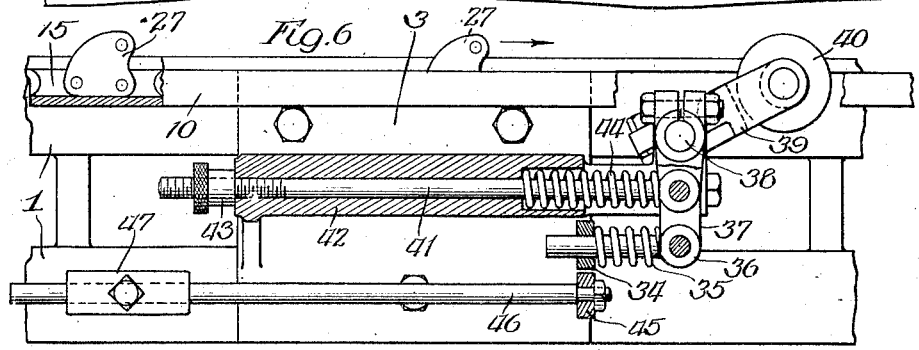
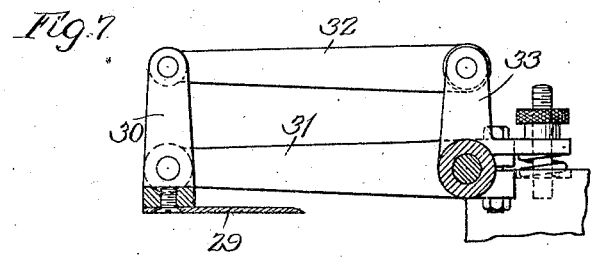
Inventor:
Joseph W. Bishop
By: Wm. O. Beet
Atty.

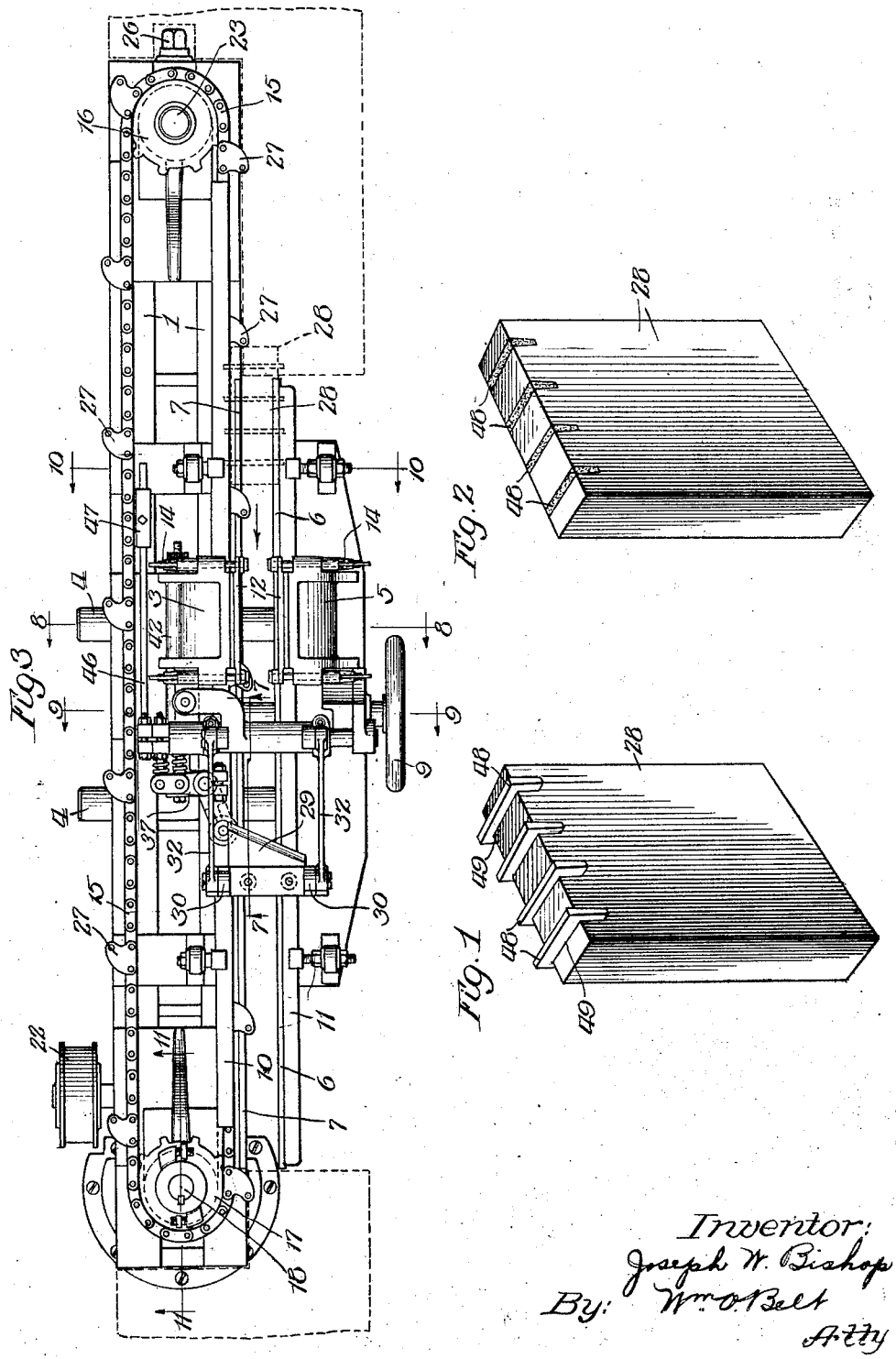

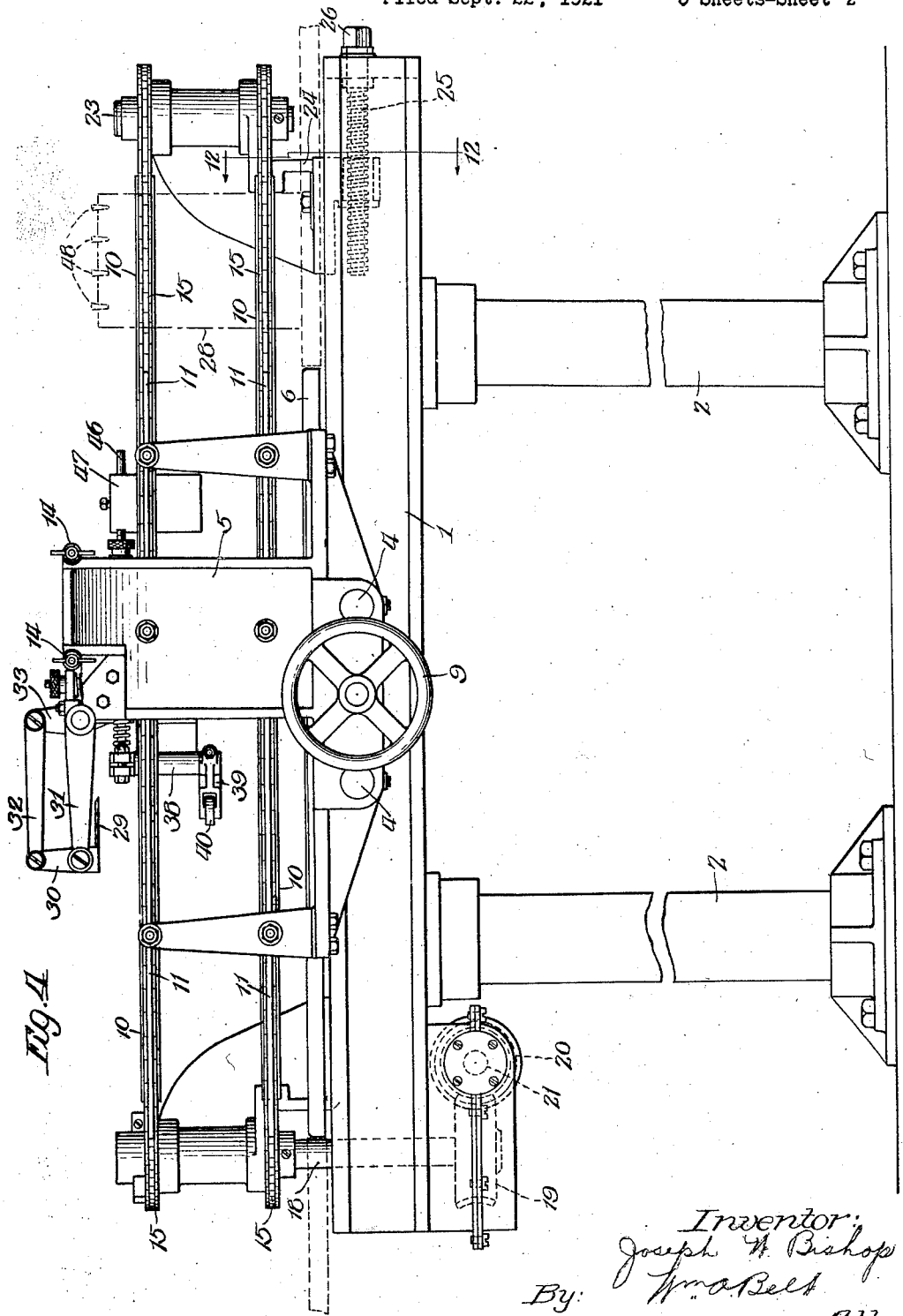

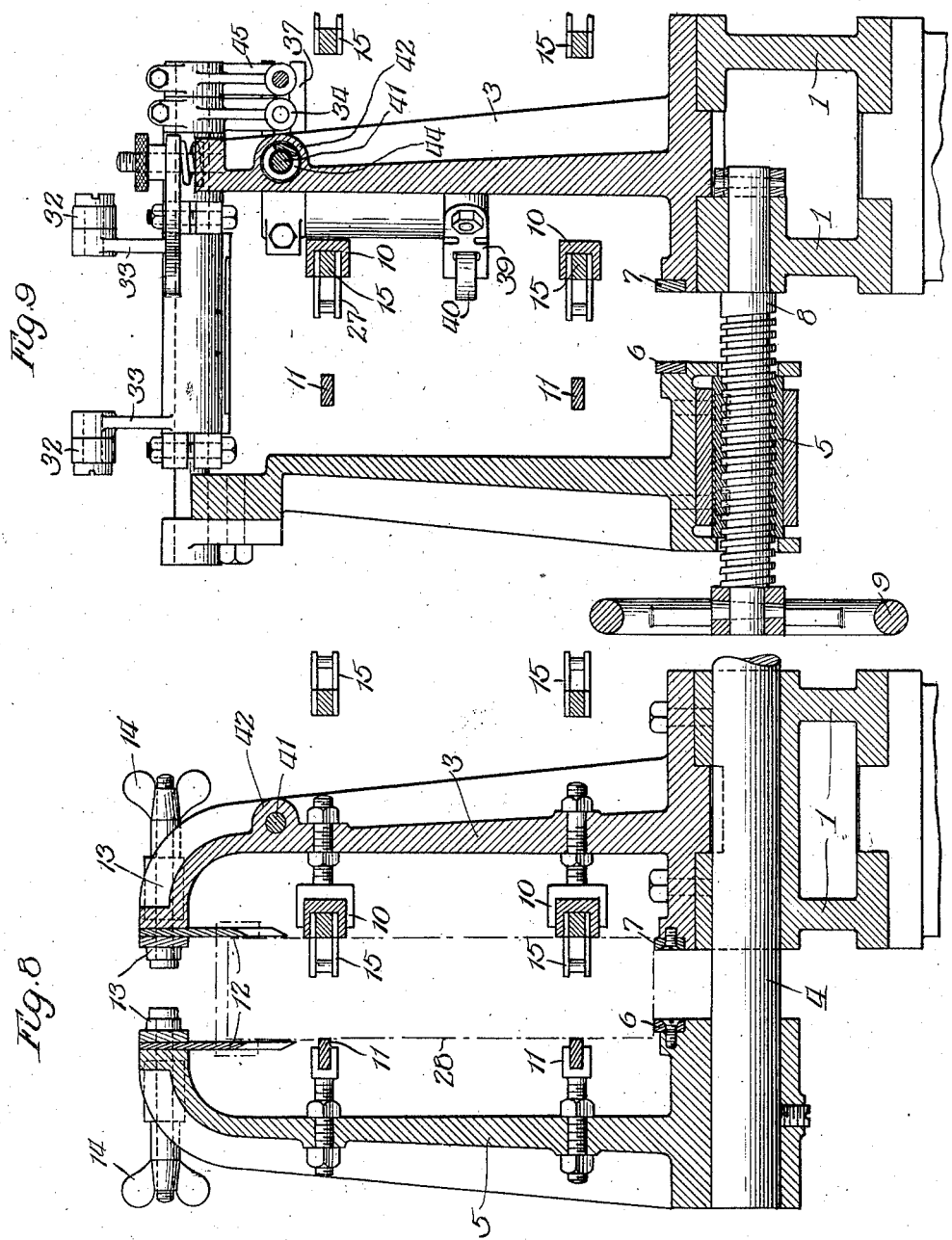

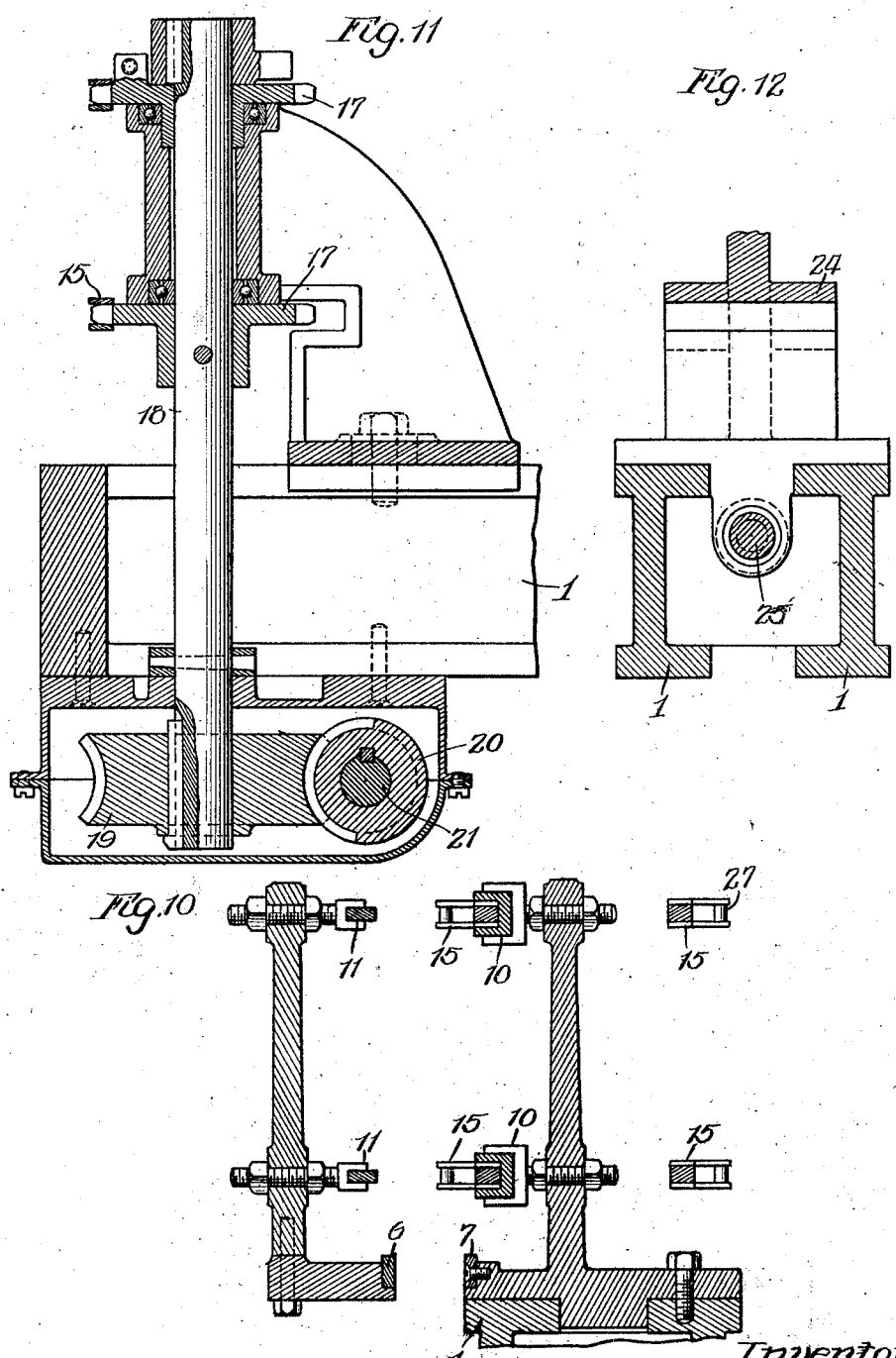

Patented Apr. 28, 1925.

1,535,805

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

LUG-CUTTING MACHINE.

Application filed September 22, 1921. Serial No. 502,335.

*To all whom it may concern:*

Be it known that I, JOSEPH W. BISHOP, a citizen of the United States, residing at Muskegon, in the county of Muskegon and State of Michigan, have invented certain new and useful Improvements in Lug-Cutting Machines, of which the following is a specification.

The rubber cells in common use in storage batteries usually have a plurality of low partitions integral with the sides and bottom. In the process of manufacture the cells are formed on metal cores which carry the lugs for forming the partitions in the cells extending across one end of the cores, or plugs, as they are called. In practice, strips of rubber of greater width and length than the lugs are forced into the slots and the excess material is afterwards cut away so that the lugs remaining will present a straight, clean surface that will readily unite to the sides and bottom of the cell.

The object of this invention is to produce a machine for cutting or trimming these lugs smoothly and accurately and in which the human element will be eliminated as far as possible.

Further objects of the invention will appear as the description is read in connection with the accompanying drawings in which—

Fig. 1 is a perspective view of a plug with the lug strips in place;

Fig. 2 is a similar perspective view of the plug after the lugs have been cut away;

Fig. 3 is a plan view of the machine illustrating one embodiment of this invention;

Fig. 4 is a front elevation of such a machine.

Fig. 5 is a partial rear elevation of the machine.

Fig. 6 is a transverse sectional view on the line 6—6 of Fig. 5.

Figs. 7, 8, 9, 10 and 11 are sectional views on the lines 7—7, 8—8, 9—9, 10—10 and 11—11 respectively of Fig. 3.

Fig. 12 is a transverse sectional view on the line 12—12 of Fig. 4.

In the drawings 1 indicates the base of a machine supported on suitable columns 2. Secured to the base is an upright structure 3 (Figs. 8 and 9) and adjustably mounted on the base by means of the rods 4 is a similar upright frame 5. Near the bottom of these two frames are suitable rails 6 and 7 on which the plugs travel as they are fed through the machine. Owing to the fact that plugs for different sizes of cells differ in width, I provide a shaft 8 (Fig. 9) journalled in the base 1 and threadedly engaged with the frame 5 whereby the two upright frames may be adjusted for width. The shaft 8 may be equipped with a hand wheel 9 or any other suitable device for rotating it manually. Above the rails 6 and 7 each frame is provided with a pair of guides 10 and 11 for confining the plugs to a predetermined path through the machine. Above the upper guides 10 and 11 the frames 3 and 5 are bent inwardly and provided with suitable knives 12 secured to the frames by bolts 13 equipped with wing nuts 14 or any other suitable binding devices. By reference to Fig. 8 it will be obvious that the knives 12 are outside the line of the guides, so that they will not contact with a plug held thereby. For the purpose of feeding the plugs through the machine I provide a pair of conveyor chains 15 traveling around sprocket wheels 16 and 17, the latter being mounted on a vertical shaft 18 suitably journalled in the rear end of the base 1 and equipped at its lower end with a worm gear 19 meshing with the worm 20 on a horizontal shaft 21 driven by a belt running on a pulley 22 or any other suitable power devices. In order to provide for adjusting the distance between the sprocket wheels 16 and 17 I have mounted the shaft 23 carrying the sprockets 16 in a bracket 24 slidably mounted on the front end of the base 1 and threadedly engaged with a screw 25 swiveled to the base 1 and having a suitable head 26 to which a wrench or crank may be applied for rotating the screw to adjust the position of the shaft 23. Each conveyor chain 15 is provided with a series of abutments 27 adapted to bear against the rear side of a plug 28 that is to be fed through the machine.

The knives 12 have suitably tapered edges and when adjusted to the proper width will trim the sides of the lugs as the plugs are fed between the knives by the conveyor chains 15. In order to trim the tops of the lugs I interpose a third knife 29 in the path of the lugs, preferably in the rear of the knives 12. Owing to the fact that it is impractical to make all the plugs for a certain size of battery, of exactly the same length, it is necessary to mount the knife 29 on an adjustable support and provide mechanism for moving it to the proper place as the plug is passing. I accomplish this by securing the knife to a rocking frame 30 pivoted to the ends of a lever 31 and a link 32, the opposite ends of which are pivoted to an upright support 33. The lever 31 has a vertically extending arm 34 which is acted upon by a spring 35 wound about a guide rod 36 pivoted to arm 37 of a bell crank lever pivoted on the vertical shaft 38 and having another arm 39 carrying a roller 40. Also, connected with the arm 37 is a rod 41 passing through a fixed part of the machine 42 and equipped with a knurled nut 43 by which its effective length may be adjusted. A spring 44 carried about the rod 41 and interposed between the arm 37 and a fixed member 42 assists the spring 35 in holding the roller 40 normally in the path of an advancing plug 28. As the plug comes against the roller 40 the bell crank lever is rotated about its axis 38 and the spring 35 is forced against the vertical arm 34 of the lever 31, and through the parallel mechanism 30, 31, 32 and 33, lowers the knife 29 onto the top of the advancing plug in time to trim the lugs projecting above the top. The spring 35 permits the knife 29 to stop on top of plugs of different height without injury to either the knife or the lever mechanism. In order to maintain the knife normally in upright position, I provide the lever mechanism with an additional vertical arm 45 to which is fixed one end of a rod 46 carrying at its free end a weight 47.

Fig. 1 shows a plug having the rubber strips 48 fitted in the slots 49 and ready to be trimmed or cut to the size shown in Fig. 2. This can be accomplished with my machine by merely feeding the plugs one at a time into the path of the abutments 27 at the right end of the machine, as shown in dotted lines in Fig. 4. The abutments will catch the plugs and force them along the tracks 6 and 7 and between the guides 10 and 11 as indicated in Figs. 3 and 8 so that they will pass between the knives 12 and beneath the knife 29 and be accurately and smoothly trimmed to just the length and width required to take care of the shrinkage resulting from vulcanization. After adjusting the machine to the particular size of plug, no skill is required to produce uniform and accurate cutting of the lugs.

I am aware that changes in the form and proportion of parts, and in the details of connstruction of my invention may be made without departing from the spirit or sacrificing any of the advantages thereof, and I reserve the right to make all such changes as fairly fall within the scope of the following claims.

I claim:

1. In a lug cutting machine, a base, a frame mounted on said base, a second frame adjustable relative to the first frame, adjustable guides carried by said frames, a pair of knives carried by said frames in parallel relation, means for feeding plugs along said guides and between said knives, a third knife arranged above said guides, and means actuated by the advancing plug for moving the third knife into position.

2. In a device of the class described, a base, guides on said base, a knife carried by the base, means for feeding plugs along said guides, and means actuated by engagement with the side of an advancing plug for lowering said knife into operative position to trim an end of the plug, and yielding means associated with the last named means for accommodating plugs of different length.

3. In a machine for cutting lugs from plugs, guides adapted to engage the plugs proper, means for feeding the plugs along said guides, a knife disposed along the path of said plugs, and means actuated by engagement with the plugs proper for bringing the knife into a position wherein it will cut away the lugs projecting from the plugs.

4. In a machine for cutting lugs from plugs, adjustably mounted guides adapted to engage the body portions of the plugs, means for feeding the plugs along said guides, a knife disposed in the path of said plugs to cut away the lugs projecting from the plugs, and means actuated by engagement with the body portions of the plugs for bringing the knife into a position wherein it will cut away the lugs projecting from the plugs.

5. A machine for cutting lugs from plugs comprising a frame, a second frame adjustably mounted upon the first mentioned frame, a guide adjustably mounted upon the first frame and adapted to engage the body portions of the plugs, a second guide adjustably mounted upon the second frame and adapted to engage the body portions of the plugs, a knife secured to the first frame, a second knife secured to the second frame, and means for feeding the plugs along said guides.

6. A machine for cutting lugs from plugs comprising a frame, a second frame adjustably mounted upon the first mentioned frame, a guide adjustably mounted upon the first frame and adapted to engage the body portions of the plugs, a second guide adjustably mounted upon the second frame and adapted to engage the body portions of the plugs, a knife secured to the first frame, a second knife secured to the second frame, means for feeding the plugs along said guides, a third knife, and means actuated by engagement with the body portions of the advancing plugs for moving said third knife into operative positions with respect to the plugs.

7. In a machine for cutting lugs from plugs, adjustable guides for the body portions of the plugs, means for feeding the plugs along said guides, a knife disposed along the path of said plugs for cutting away the lugs projecting therefrom, and yielding means for bringing said knife into positions wherein it will trim the lugs projecting from the plugs.

8. In a machine for cutting lugs from plugs, guides adapted to engage the body portions of the plugs, a knife, and means including parallel link motion mechanism for bringing said knife into a plurality of positions to cut away the lugs from said plugs.

9. In a machine for cutting lugs from plugs, guides for the body portions of the plugs, means for feeding the plugs along said guides, a knife, parallel link motion mechanism carrying said knife, and means actuated by engagement with the body portions of the plugs for causing said parallel link motion mechanism to bring said knife into positions wherein it will cut away the lugs projecting from said plugs.

JOSEPH W. BISHOP.